June 28, 1966 R. A. BLOWERS 3,258,280
FLUID PRESSURE APPARATUS
Filed Dec. 9, 1963
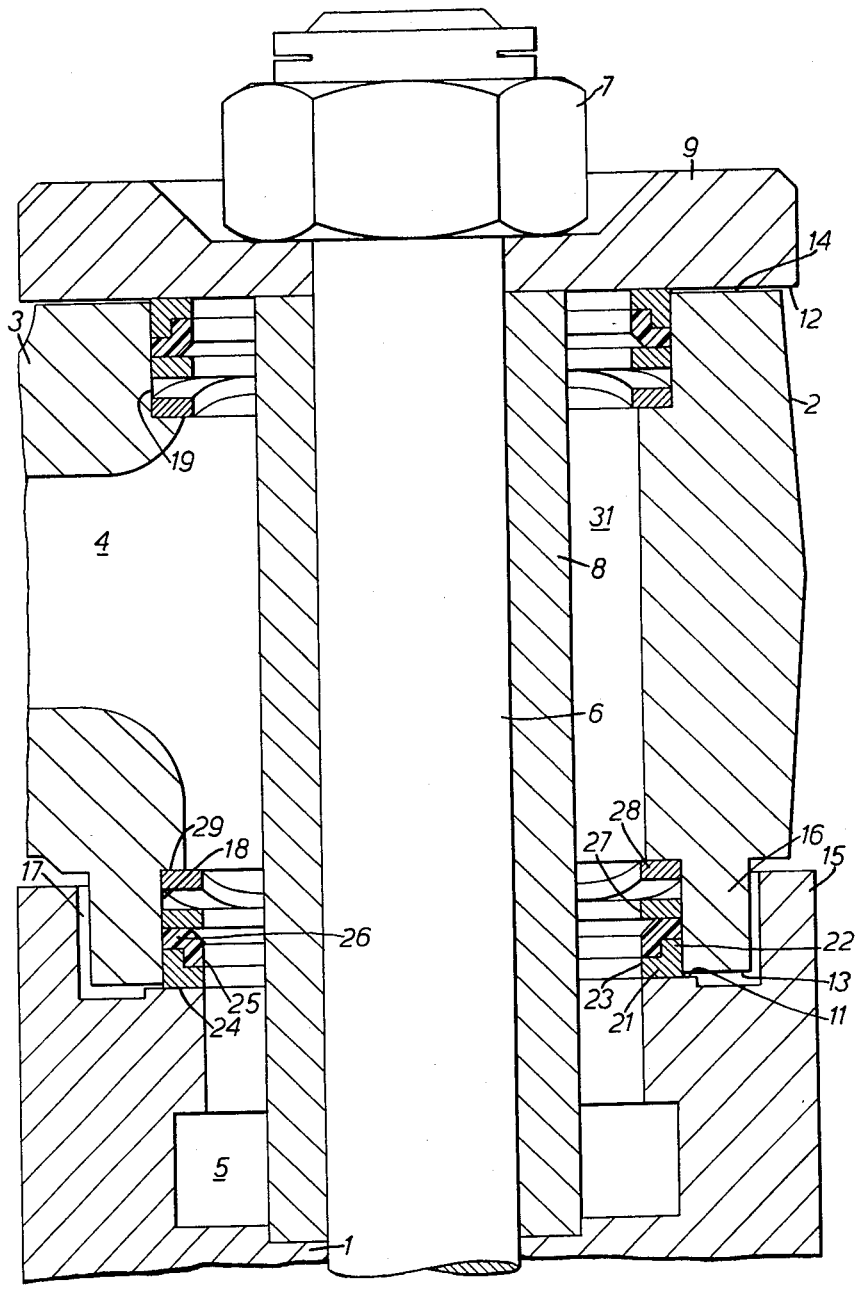
INVENTOR
ROGER A. BLOWERS
BY
Reynolds & Christensen
ATTORNEY

United States Patent Office 3,258,280
Patented June 28, 1966

3,258,280
FLUID PRESSURE APPARATUS
Roger A. Blowers, Barnwood, England, assignor to Dowty Technical Developments Limited, a British company
Filed Dec. 9, 1963, Ser. No. 329,193
Claims priority, application Great Britain, Dec. 10, 1962, 46,487/62
6 Claims. (Cl. 285—190)

This invention relates to fluid apparatus and more particularly to a fluid pressure sealing assembly.

A fluid pressure sealing assembly in accordance with the present invention comprises one member having a cylindrical seating, a second relatively rotatable member having a flat seating maintained substantially at right-angles to the axis of the cylindrical seating, a first ring having a skirt portion engaging the cylindrical seating and an integral flange engaging the flat seating, and a second ring of softer material than the first ring engaged between the edge of the skirt remote from the flange and the cylindrical seating, the fluid pressure to be sealed acting on the rings to urge the flange into sealing contact with the flat seating and acting on the second ring to seal against leakage that might occur between the skirt and the cylindrical seating and also to create friction between the skirt and the cylindrical seating to hold or tend to hold the first ring against rotation relative to the cylindrical seating.

The provision of the second ring to act against the edge of the skirt remote from the flange enables the skirt to be constructed with a comparatively short axial length which will permit a small degree of tipping of the first ring relative to the cylindrical seating in order that the flange may seat fully in a liquid tight manner against the flat seating.

The first ring may be made of a metal such as aluminium bronze or Phosphor bronze whilst the second ring may be made of a synthetic plastic material such as nylon.

The second ring may include a portion engaged frictionally on the surface of the skirt opposite to the surface thereof which engages the cylindrical seating.

Preferably the axial length of the first ring is less than one-tenth of the diameter of the cylindrical seating to permit substantial tipping of the first ring under the action of fluid pressure to enable the flange to engage in a fluid tight manner on the flat seating. Further in accordance with the present invention a pivotal connection for carrying fluid at pressure comprises a first member having a pair of spaced abutment surfaces held in spaced relation by a stem, an annular member surrounding the stem and from which a pipe extends, the annular member including a pair of abutment surfaces which engage between the spaced abutment surfaces to form two pairs of adjacent abutment surfaces, each pair of abutment surfaces being formed as a fluid pressure sealing assembly as defined in the preceding paragraphs.

The annular member may be loosely located only on the first member so as to be capable of slight tipping and sliding movement relative to the first member in addition to rotation about the axis of the stem.

One embodiment of the invention will be described with reference to the accompanying cross-sectional drawing of a pivotal connection. The pivotal connection comprises a main member 1 and an annular member 2 pivotally mounted on the main member. A pipe 3 having a passage 4 extends from the annular member and is arranged to conduct pressure fluid to and from a passage 5 within the first member. For mounting the annular member 2 on the first member 1 a bolt 6 extends from the first member on which are fixed, by means of a nut 7, a spacing member 8 and a circular abutment 9.

The fluid passage 5 is formed concentrically around the bolt 6 and spacing member 8. At the position where the passage 5 leaves the first or main member 1 a flat surface 11 is formed on the first member, which may be called an abutment surface, although it is not intended to be contacted by any surface other than a part of the sealing means. The abutment member 9 also includes a flat surface 12 also termed, in the same sense, an abutment surface, facing the surface 11. These two surfaces are parallel and are held slightly spaced by means of the spacing member 8 which, in effect, forms a stem. The annular member 2 is formed with a pair of flat surfaces 13 and 14 also termed abutment surfaces, which face the respective surfaces 11 and 12. The spacing of the surfaces 13 and 14 is slightly less than the spacing of the surfaces 11 and 12, so that the annular member 2 is capable of slight tipping movement relative to the member 1 in addition to rotation about the axis of the stem 8. A cylindrical projection 15 extends from the first member separately around the surface 11 and encloses a cylindrical projection 16 formed on the annular member 2, the flat surface 13 being formed at the end of the projection 16. The projection 15 has an internal diameter slightly larger than the external diameter of the projection 16, leaving a space 17 within which it is possible for the annular member 2 to slide transversely relatively to the member 1 or to tilt slightly with respect thereto. The basic function, however, of the projections 15 and 16 is to provide that the annular member 2 may rotate relatively to the member 1 about the axis of the stem 8.

For the purpose of preventing leakage of pressure fluid a pair of seal assemblies are provided located in cylindrical recesses 18 and 19 which extend inwardly from the surfaces 13 and 14 and open to the pressure within the chamber 31. These recesses form cylindrical seatings. The sealing assemblies in these recesses are identical and the assembly in recess 18 only will be described in detail. A ring 21 of a springy metal such as aluminium bronze or Phosphor bronze is formed by a cylindrical skirt portion 22 and an intergal flange portion 23. The outer diameter of the skirt portion is an accurate sliding fit within the cylindrical recess 18 and for this purpose a clearance of .001 to .004 inch is normally provided between the skirt and the cylindrical seating. The flange portion 23 includes a flat surface 24 for engagement with the flat surface 11. A ring 25 of nylon engages within the skirt portion 22 of ring 21 fairly tightly and a projection 26 from the ring 25 extends around the edge of the skirt portion 22 opposite to the flange 23 to engage the wall of the cylindrical recess 18. A metal washer 27 is pressed against the ring 25 by means of a "wave" spring 28 which reacts against the bottom 29 of the recess 18. The "wave" spring 28 will exert an axial force on the washer 27 which, in turn, will press on ring 25 to urge it and the ring 21 so that the surface 24 of the ring 21 engages the flat surface 11 of member 1.

A liquid flow passage thus extends from the passage 5 in member 1 through the space between the ring assembly in recess 18 and the stem 8 into an annular space 31 within the annular member 2. The space 31 is in direct communication with the passage 4 in the pipe 3. Pressure in the passage 5 and space 31 will act on the rings 21 and 25 to urge them axially so that surface 24 engages the surface 11 strongly to form an effective seal against leakage of fluid between these surfaces. The projection 26 of the ring 25 being a flexible material will engage the wall of recess 18 effectively to ensure that there is little or no leakage along the cylindrical wall of the recess 18. This ring 25 is chamfered at its interior corner distant from ring 21, and pressure acting upon this chamfer urges the ring 25 radially outwardly as well as axially towards the ring 21. The radial expansion is particularly useful.

Within the recess 19 a similar ring assembly is provided which seals both against the cylindrical wall of the recess 19 and against the flat surface 12 of the abutment 9 to prevent any substantial leakage.

For each seal assembly the fluid pressure will act to expand the rings 21 and 25 outwardly into contact with the recess wall 18 or 19 and also it will act axially to urge surface 24 against the flat surface 11. Since the surface 24 is a metallic surface and it co-operates with a metallic surface 11 there will be a comparatively low co-efficient of friction as a result of axially directed forces. However, in the case of the ring 25 it has a higher co-efficient of friction on metal and since it is pressed into engagement both with the wall of the recess and the inner surface of the skirt portion its radial expansion will create a substantial frictional force. Therefore, when the annular member 2 rotates round the stem 8 it will carry the ring assemblies with it and, in particular, the flat surface 24 of ring 21 will move relatively to the flat surface 11 or 12 of the abutments. The wear that must take place following the rotational movement of the member 2 will, therefore, be substantially confined to the flat surfaces of the rings 21 and such wear is automatically compensated by axial movement of the rings, whereas if the cylindrical surfaces were subject to wear there would be no way to compensate therefor.

The annular member 2 is also capable of slight sliding movement, in the radial direction, relative to the member 1 within the clearance 17 between the projections 15 and 16. During such sliding movement, the surfaces 24 of rings 21 will slide over the abutment surfaces 11 and 12 without the tightness of the fluid seal being altered.

The annular member 2 is also capable of slight tipping movement relative to the member 1 because of the slight clearance that must exist between the adjacent surfaces 12 and 14 on the one hand and the adjacent surfaces 11 and 13 on the other hand. Such tipping movement will cause slight inclination of the recesses 18 and 19 to the axis of the stem 8. Since the rings 21 at the cylindrical engaging surfaces of the skirt portions have a very short axial length as compared with their diameter, it will be seen that slight tipping movement of the rings 21 can take place within the recesses so that the flat surfaces 24 of the rings 21 may maintain continuous contact with flat surfaces 11 and 12. The tipping of the rings within the recesses 18 and 19 is possible because of very slight clearance necessary to obtain a sliding fit of the rings 21 and also because of the resilience of the metal of which they are made. The tightness of the seal between the cylindrical surface of the skirt portion 22 and the wall of the recess is not effectively altered during tipping, particularly because of the fact that the projection 26 of the nylon ring 25 is capable under the action of the fluid pressure of slightly distorting to maintain continuous effective sealing against the wall of the recesses 18 or 19.

I claim as my invention:

1. A pivotal connection sealed against leakage of internal fluid pressure, comprising an annular rotative first member chambered to contain fluid under pressure, a pipe leading from such chamber, a second member relative to which said first member rotates, means extending through the chamber to interconnect the first member and the second member, said first member having transverse abutment surfaces at the opposite ends of the chamber, and having at each end a cylindrical seating surface opening to pressure within the chamber, said second member having transverse abutment surfaces disposed adjacent the respective abutment surfaces of the first member, but slightly spaced axially therefrom, said second member also having two flat seating surfaces adjacent and generally prependicular to the axis of the respective cylindrical seating surfaces, and sealing means spaced radially outwardly from the means that interconnects the first member and the second member, said sealing means being interposed between each of the adjacent cylindrical and flat seating surfaces, and each sealing means comprising a first metal sealing ring generally of L-shape in cross-section, having a skirt portion engaging the cylindrical seating surface and an integral flange engaging the flat seating surface, and a second sealing ring of material that is somewhat deformable, and of a cross-sectional shape generally complemental to the shape of the first ring, and bearing axially upon the latter, said second sealing ring having a portion overlying the skirt portion of the first ring and bearing radially and frictionally upon the cylindrical seating surface, to deter leakage between the complemental cylindrical seating surfaces, and also having a portion frictionally and axially engaging the first sealing ring, by the combined effect of the two frictional engagements detering rotation of the first ring with respect to the first member, and to urge the first member onto its flat seating surface, to prevent leakage therebetween, and means to bias the rings of the respective sealing means towards their sealing positions in the absence of internal pressure within the chamber.

2. A fluid pressure sealing assembly as claimed in claim 1, wherein the second sealing ring includes a portion engaged frictionally against the surface of the skirt portion opposite the surface of the latter which engages the cylindrical seating surface.

3. A pivotal connection as in claim 1, wherein the first member is shouldered opposite each corresponding flat seating surface on the second member, and spring means reacting between each shoulder and the corresponding second sealing ring, constituting the biasing means.

4. A pivotal connection as in claim 1, wherein the second sealing ring is chamfered at its interior corner, diagonally opposite the angle where the skirt portion and flange of the first sealing ring engage respectively the circumferential and the flat seating surfaces, whereby fluid pressure within the chamber further urges the second sealing ring both axially and radially into its sealing position, and in turn urges the first sealing ring axially into its sealing position with respect to the flat seating surface.

5. A pivotal connection sealed against leakage of internal fluid pressure, comprising an annular rotative first member chambered to contain fluid under pressure, and having a pair of spaced cylindrical seating surfaces, a second member relative to which said first member rotates, having a pair of spaced flat seating surfaces each of which is adjacent one of said cylindrical seating surfaces, means to hold said flat seating surfaces spaced apart against engagement with the first member, whereby the first member may tilt slightly relative to the second member, said cylindrical and flat seating surfaces being exposed to pressure within the chamber, and sealing means interposed between each of the adjacent cylindrical and flat seating surfaces, each sealing means comprising a first sealing ring of generally L-shape in cross-section, having a skirt portion engaging the cylindrical seating surface and an integral flange engaging the flat seating surface, and a second sealing ring of material somewhat softer and more pliable than said first sealing ring, whereby to accommodate tilting of the first ring, of a cross-section generally complemental to that of the first ring, to define a portion, engaged against the edge of the skirt portion of the first sealing ring to urge said first sealing ring axially against the flat seating surface, under the influence of pressure fluid within the chamber of the first member, and said second sealing ring also including a portion engaged radially against the cylindrical seating surface, also under the influence of the pressure fluid within the first member, to seal against leakage between the cylindrical seating surface and the skirt, and engaging the first sealing ring and the cylindrical seating surface frictionally, tending to hold the first sealing ring against rotation relative to said rotative first member during rotation of the latter, and means to bias the rings of the respective sealing means towards their sealing positions in the absence of internal pressure within the chamber.

6. A fluid pressure sealing assembly comprising a rotative member chambered to contain fluid under pressure, and having a cylindrical seating surface, a second member relative to which the first member rotates, said second member having a flat seating surface maintained substantially at right-angles to the axis of the cylindrical seating surface, a first ring having a skirt portion engaging the cylindrical seating surface and an integral flange engaging the flat seating surface, and a second ring of softer material than the first ring engaged against the edge of the skirt remote from the flange and also engaged against the cylindrical seating surface, means urging the rings axially towards the flat seating surface, the fluid pressure to be sealed also acting axially on the first ring to urge the flange into tight sealing contact with the flat seating surface and acting on the second ring radially outwardly to seal against leakage that might occur between the skirt and the cylindrical seating surface and also to create friction between the skirt and the cylindrical seating surface, tending to hold the first ring against rotation relative to the cylindrical seating surface.

References Cited by the Examiner

UNITED STATES PATENTS

| | | | |
|---|---|---|---|
| 712,738 | 11/1902 | Stevens | 285—190 |
| 811,934 | 2/1906 | Lea. | |
| 1,717,114 | 6/1929 | McNulty | 27—124 |
| 1,765,693 | 6/1930 | Muend | 285—185 X |
| 1,851,076 | 3/1932 | Ackerman. | |
| 2,307,328 | 1/1943 | Martin | 285—190 |
| 2,365,046 | 12/1944 | Bottomley | 277—85 |
| 2,396,123 | 3/1946 | Phillips | 277—124 X |
| 2,541,311 | 2/1951 | Vickers | 285—190 |
| 2,567,809 | 9/1951 | Greiner | 277—85 |
| 2,711,333 | 6/1955 | Rodgers | 277—124 |

FOREIGN PATENTS

| | | |
|---|---|---|
| 227,382 | 1/1959 | Australia. |
| 1,041,914 | 10/1953 | France. |
| 270,506 | 5/1927 | Great Britain. |
| 686,638 | 1/1953 | Great Britain. |

CARL W. TOMLIN, *Primary Examiner.*

R. GIANGIORGI, *Assistant Examiner.*